US008165807B2

(12) United States Patent
Garin

(10) Patent No.: US 8,165,807 B2
(45) Date of Patent: Apr. 24, 2012

(54) MULTIPATH MITIGATION USING SENSORS

(75) Inventor: Lionel Garin, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 810 days.

(21) Appl. No.: 12/100,130

(22) Filed: Apr. 9, 2008

(65) Prior Publication Data
US 2009/0096669 A1 Apr. 16, 2009

Related U.S. Application Data

(60) Provisional application No. 60/911,023, filed on Apr. 10, 2007.

(51) Int. Cl.
*G01C 23/00* (2006.01)
*G01C 21/00* (2006.01)
(52) U.S. Cl. ............... 701/478.5; 701/469; 342/357.61
(58) Field of Classification Search .................. None
See application file for complete search history.

(56) References Cited

U.S. PATENT DOCUMENTS

| 4,522,070 | A | 6/1985 | Hagen |
| 5,646,857 | A | 7/1997 | McBurney et al. |
| 5,897,605 | A | 4/1999 | Kohli et al. |
| 6,041,280 | A | 3/2000 | Kohli et al. |
| 6,055,477 | A | 4/2000 | McBurney et al. |
| 6,061,018 | A | 5/2000 | Sheynblat |
| 6,125,325 | A | 9/2000 | Kohli |
| 6,236,937 | B1 | 5/2001 | Kohli |
| 6,246,960 | B1 * | 6/2001 | Lin ........................... 701/214 |
| 6,289,280 | B1 | 9/2001 | Fernandez-Corbaton et al. |
| 6,292,749 | B2 | 9/2001 | Kohli |
| 6,381,540 | B1 | 4/2002 | Beason et al. |
| 6,400,753 | B1 | 6/2002 | Kohli et al. |
| 6,421,609 | B2 | 7/2002 | Kohli |
| 6,466,161 | B2 | 10/2002 | Turetzky et al. |
| 6,574,558 | B2 | 6/2003 | Kohli |
| 6,756,983 | B1 | 6/2004 | Borosh |
| 6,836,667 | B1 | 12/2004 | Smith, Jr. |
| 7,110,882 | B2 * | 9/2006 | Moser et al. .................. 701/214 |
| 7,171,303 | B1 * | 1/2007 | Nordmark et al. ............ 701/200 |
| 2002/0158796 | A1 | 10/2002 | Humphrey et al. |
| 2004/0054470 | A1 | 3/2004 | Farine et al. |
| 2008/0091351 | A1 * | 4/2008 | Hoshizaki ..................... 701/214 |

OTHER PUBLICATIONS

Mats Brenner, "Implementation of a RAIM Monitor in a GPS Receiver and an Integrated GPS/IRS", ION GPS-90, Satellite Division, Technical meeting, Sep. 1990, pp. 317-337.

Mats Brenner, "Integrated GPS/Inertial Fault Detection Availability", Journal of the Institute of Navigation, vol. 43, No. 2, 1996, pp. 339-358.

R. Grover Brown, "A Baseline GPS RAIM Scheme and a Note on the Equivalence of Three RAIM Methods", Journal of the Institute of Navigation, vol. 39, No. 3, 1992, pp. 101-116.

John Hopkins, "Integrated Satellite Navigation and Strapdown Attitude and Heading References for Civil Air Carriers", ION Aerospace Meeting, Apr. 1981, pp. 95-104.

Karl Kovach et al., "PPS RAIM Algorithms and their Performance, Journal of the Institute of Navigation", vol. 42, No. 3, 1995, pp. 179-193.

(Continued)

Primary Examiner — Michael J. Zanelli

(57) ABSTRACT

Systems, methods and devices for multipath mitigation are presented. Specifically, embodiments of the invention can advantageously use sensor inputs to mitigate the effect of multipath signals received at a receiver. The use of physical sensors in navigation systems is deemed particularly advantageous.

18 Claims, 2 Drawing Sheets

OTHER PUBLICATIONS

Young Lee et al., "Summary of RTCA SC-159 GPS Integrity Working Group Activities", Journal of the Institute of Navigation, vol. 43, No. 3, 1996, pp. 195-226.

Young C. Lee, "RAIM Availability for GPS Augmented with Barometric Altimeter Aiding and Clock Coasting", Journal of the Institute of Navigation, vol. 40, No. 2, 1993, pp. 261-280.

Lawrence Vallot et al., "Design and Flight Test of Differential GPS/Inertial Navigation System for Approach/Landing Guidance", Journal of the Institute of Navigation, vol. 38, No. 2, 1991, pp. 321-340.

Karen L. Van Dyke, "RAIM Availability for Supplemental GPS Navigation", Journal of the Institute of Navigation, vol. 39, No. 4, 1992-1993, pp. 139-153.

European Search Report—EP08153140—Place of search: The Hague, date of mailing Nov. 9, 2009.

Lionel J. Garin et al, "Enhancing Altitude Accuracy in Automotive Navigation Using MEMS Barometric Sensor with GPS," Proceedings of the 2008 National Technical Meeting of the Institute of Navigation, Jan. 28, 2008, pp. 670-679, XP002521801, San Diego, CA, USA.

* cited by examiner

MULTIPATH MITIGATION USING SENSORS

CROSS REFERENCE TO RELATED APPLICATIONS

This application claims the benefit of U.S. Provisional Application 60/911,023, entitled "Multipath Mitigation Using Sensors" filed Apr. 10, 2007, the contents of which are hereby incorporated by reference.

BACKGROUND OF THE INVENTION

The embodiments of the present invention relate generally to the detection, use and/or mitigation of multipath signals for communication and especially navigation systems. Certain embodiments further relate to the detection, use and/or mitigation of multipath signals for GNSS systems.

Wireless communications systems generally experience an effect known as "multipath". "Multipath" refers to the reception of a non-line of sight signal from a signal source. Multipath signals may result, for example, from the reflection of a signal from a nearby reflector, such as the ground, a building face or the surface of a body of water. Multipath signals may also result when signals are significantly refracted. In general a non-reflected or refracted (straight line) signal is referred to simply as the "signal", "true signal" or "line of sight signal", whereas a reflected or refracted signal is referred to as a multipath signal. Since the multipath signal does not travel along the line of sight, it always arrives at the receiver later than the true signal.

Multipath signals, although sometimes useful, are often detrimental to signal quality. As an example, if the chipping frequency of a ranging signal is approximately 1 MHz, a multipath signal that travels along a reflected path with an additional 300 m length will arrive one chip later. When superimposed on the true signal, it distorts the received signal quality and can in some cases result in a complete loss of signal.

Multipath problems are also detrimental to navigation systems, especially those that rely on the time of reception of received signals, such as used in Global Navigation Satellite Systems (GNSS) such as the Global Positioning System (GPS) or Galileo. FIG. 1, although an illustration of embodiments of the invention, and not of prior art, can help illustrate the detrimental effect of multipath signals in navigation schemes that rely on the time of reception of a signal.

FIG. 1 illustrates a two-dimensional satellite navigation case. A receiver 100 is located at a point 100 on the surface 110 of the Earth, which is marked in this case with the arrow indicating the "true position" of the receiver 100. The receiver 100 receives signals from satellites 102 and 104. In the two dimensional case where the receiver time with respect to satellite system time is accurately known, the time of reception of the two satellite signals is sufficient to compute a two-dimensional position fix. Receiver 100 is in an "urban canyon" environment, surrounded by buildings 106 and 108.

As illustrated in FIG. 1, receiver 100 is able to receiver a line of sight signal 112 from satellite 104, but line of sight signals 114 from satellite 102 are blocked by building 106. Receiver 100 receives instead multipath signals, here shown as a single signal 116 from satellite 102. Since the multipath signal 116 travels a longer distance to receiver 100 than the line of sight signal would have traveled, receiver 100 records a later time for the time of arrival of the signal.

The computed position 118 of the receiver based on the time of arrival of the signals of satellites 102 and 104 occurs at one of the intersection points of two circles defined with centers at the satellites and respective radii equal to the measured distance of the receiver 100 from the satellite. Because receiver 100 measures a greater distance from satellite 102 than the actual distance to satellite 102, the relevant intersection point is calculated lower than and to the right of receiver 100's true position.

In the past, multipath mitigation strategies have focused on signal processing techniques, such as the rejection of late arriving signals or the analysis of signal shape. These processing techniques are, unfortunately, limited in their ability to accurately remove the effects of multipath from the positioning solution provided by navigation receivers. Furthermore, traditional techniques have not been able to determine whether a line of sight signal is present, or whether only multipath signals are present. Thus, improved methods, systems and devices are called for.

SUMMARY OF THE INVENTION

Certain embodiments of the present invention relate to navigation receivers, comprising: a physical sensor input; circuitry coupled to the physical sensor input; and wherein the circuitry is configured to use information from the physical sensor input for multipath mitigation. Such navigation receivers can be further configured such that the physical sensor input is adapted to be connected to a physical sensor, wherein the relative measurements of the physical sensor are more accurate than the absolute measurements of the physical sensor; wherein the physical sensor is a pressure sensor; and/or wherein the physical sensor input is adapted to be connected to an inertial sensor.

In certain embodiments the circuitry comprises central processing unit executing a position solution section, a velocity solution section, a Kalman filter and an atmospheric model section. Additionally, the navigation receiver can be configured such that the circuitry coupled to the physical sensor input is configured to derive first position-related data from the sensor input; and wherein the circuitry coupled to the physical sensor is configured to blend the first position-related data with second position-related data received from a GNSS sensor. The navigation receiver can be configured such that the circuitry coupled to the physical sensor input is configured to carry out a complementary filter operation.

Embodiments of the invention further relate to a method for multipath mitigation, comprising receiving a GNSS measurement; calculating a position based on the GNSS measurement; receiving a first position-related datum derived from a physical sensor input and corresponding approximately in time to the GNSS measurement; determining whether the position based on the GNSS measurement was significantly affected by multipath by using the first position-related datum. The method can be extended to include situations wherein the step of determining whether the position based on the GNSS measurement was significantly affected by multipath further comprises using a second position-related datum derived from the physical sensor input and corresponding to a time previous to the time of the GNSS measurement. Furthermore, the method can be performed such that the step of determining whether the position based on the GNSS measurement was significantly affected by multipath comprises computing a difference between the first position-related datum and the second position-related datum. Preferably, the first position-related datum is an altitude or an acceleration and optionally the altitude is calculated using an atmospheric model.

In certain embodiments, the method will further comprise the step of filtering the difference between the first position-related datum and the second position-related datum with a complementary filter having as an input a corresponding position-related datum derived from GNSS signals. Optionally, the complementary filter comprises a high-pass filter and a low-pass filter.

Other embodiments relate to a portable navigation system, comprising a GNSS sensor; a physical sensor; and a microprocessor configured to use input derived from the GNSS sensor and the physical sensor to perform multipath mitigation. The portable navigation system can be configured such that the physical sensor is a pressure sensor, and the system comprises a machine-readable medium comprising software instructions that, when executed by the microprocessor, perform a method comprising the steps of computing a GNSS position; computing a position change based on a measurement derived from the physical sensor; and comparing the position change against a threshold to determine whether the GNSS position is likely to be significantly affected by multipath. The position change preferably comprises a change in altitude; and the method advantageously further comprises augmenting the GNSS position with altitude information derived from the physical sensor through the use of a complementary filter.

DETAILED DESCRIPTION OF THE PREFERRED EMBODIMENTS

Numerous embodiments of the present invention relate to the concept of "multipath mitigation" in navigation systems. As used herein, "multipath mitigation" means a lessening of detrimental effects of multipath signals.

In general, embodiments of the invention accomplish multipath mitigation by using information, which may be any kind of information, usually encoded as a digital or analog signal, derived from a sensor that provides information from a source other than the primary GNSS system being used for position fixes. For example, if the sensor is provided to supplement a Galileo receiver, the sensor may be based on a GPS receiver. Here, the term "derived from" means "retrieved as the direct output of" or "modified from the output of". The sensor may also be a "physical sensor". A physical sensor is a device that senses the more immediate physical environment of the receiver, as opposed to a sensor that detects wireless signals broadcast by distant transmitters such as navigation satellites or remote pseudolites. Examples of physical sensors can include inertial sensors, altimeters, speedometers, etc.

A number of inventive concepts will become clear if explained in reference to a receiver embodiment that employs a pressure sensor to monitor altitude and uses information about the altitude to improve its position fix calculations. The pressure information relayed by the sensor provides physical information about the position and displacement of the receiver between GPS fixes. If multipath is experienced by the GPS section of the receiver, the calculated position will significantly vary from one fix to another. The fix will shift significantly in vertical and horizontal directions. The instantaneous shift (meaning the shift between two fixes adjacent in time, here assumed to be 1 second apart) can be in the order of tens of meters horizontal and vertical. The sudden jump in position from one second to the other represents an acceleration incompatible with the actual acceleration capabilities of the user using the receiver. The difference between calculated GPS vertical position and altitude as measured by the pressure sensor is used as a multipath detection mechanism. In other embodiments, the GNSS position fixes are filtered using sensor data to mitigate the effects of multipath and other errors.

Figure 1:
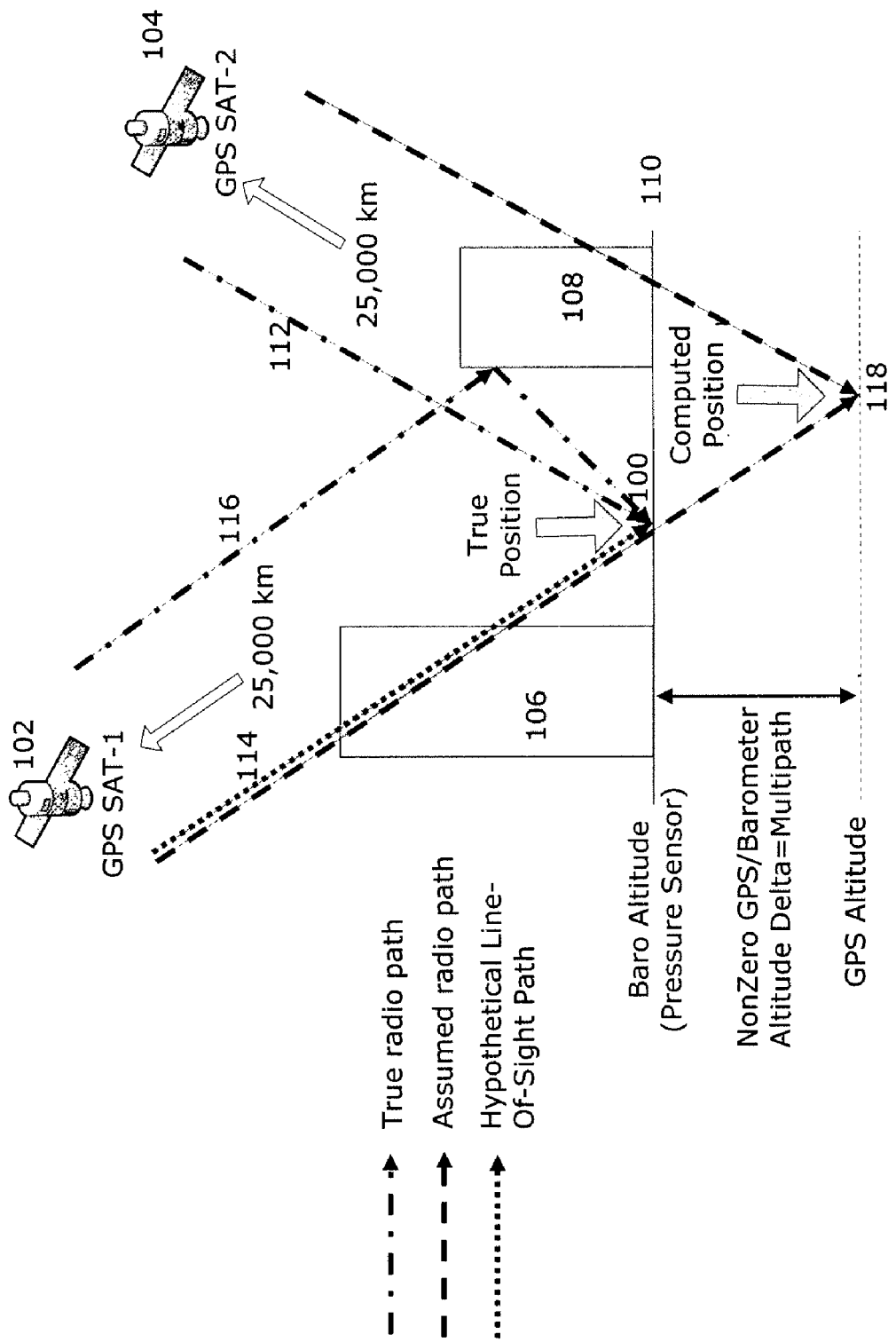
FIG. 1 illustrates a two-dimensional GNSS multipath problem and aspects of preferred embodiments.

This concept is illustrated in FIG. 1, which shows a two dimensional navigation system problem as described in the Background section. If the receiver 100 is in motion, as would be the case for a pedestrian or vehicle, it will experience sudden emphasis on multipath signals based on line of sight signal blockage. For example, if the receiver 100 is moving from building 108 in the direction of building 106, it will at some point experience a blockage of line of sight signal 114 and the reception of multipath signal 116. This can lead to a sudden shift in the calculated position of the receiver, for example, from the true position of the receiver 100 to the computed position 118.

Physical sensors can be used to detect these sorts of multipath effects. If the user were physically moved from a static position to a position 40 meters away within one second, and if one makes the assumption of a constant positive acceleration in the first half of the one second interval, and a negative constant acceleration in the second half of the one second interval, to come to rest after one second, the constant acceleration should be 160 m/s$^2$ or +16 G for 0.5 s and −16 G for the remaining 0.5 s, with a maximum velocity of 288 km/h at 0.5 seconds. Such acceleration is highly unlikely for any receiver that is associated with the location of a human being. Thus, appropriate for any particular application, a threshold change can be chosen that can be used to determine whether or not a particular GNSS position fix is likely to be significantly affected by multipath. The choice of the threshold can depend, of course, on the expected velocity of the receiver as illustrated in the above example. Preferred embodiments will compare a calculated GNSS displacement with a measured vertical displacement measured, for example by means of a pressure sensor.

Currently available pressure sensors using, for example, MEMS (Microelectromechanical Systems) technology, have a resolution level in equivalent altitude of about 0.2 meters. One example of such a sensor is the SMD-500 manufactured by BOSCH Sensortec. Such sensors have a relatively good dynamic response, sufficient to track stair climbing for example. It is generally possible using MEMS technology to determine the current floor of a user.

While pressure information is continuously varying due to weather conditions, the time constant of this variation is in tens of minutes. Pressure sensor information can thus be calibrated by the GNSS information. This is a case of absolute accurate information, but with high noise level (GNSS information) versus relative information, but with a quite accurate relative displacement (pressure derived altitude information). That is, GNSS positioning has a lower accuracy, but produces a position relative to known Earth-centered Earth-fixed coordinates. A pressure sensor produces a pressure relative to a standard which is slowly varying, but which can be assumed to be the same between any two GNSS fixes. The blending of both types can be done, for example, by a complementary filter or by a Kalman Filter.

The same technique, i.e. detecting the discrepancy between GNSS reported position and sensor-reported information over short intervals for multipath mitigation, can be used with other sensors, the most natural being accelerometers. Certain additional difficulties are created thereby, including that an accelerometer in some embodiment would need extra attitude information. In other embodiments, an accelerometer can be used to determine whether the average acceleration regardless of direction is consistent with an acceleration as determined by a GNSS system.

A pressure sensor, in contrast has a natural assumed displacement measurement direction (vertical). Accelerometers could be used to detect spurious acceleration, but the conversion of acceleration into displacement equivalent is difficult. There may be also some spurious exception conditions, for example, when the accelerometer detects an impact shock. Also, vertical acceleration will be much less than horizontal one, so it will generally be more difficult to detect between true and false acceleration.

In certain embodiments, a pressure sensor can be calibrated using GPS information to derive an accurate altitude. This pressure sensor calibration is not necessary for multipath mitigation, as there one is interested in the sudden, relative variations or lack thereof in the altitude, but calibration can be done where absolute altitude measurements are desirable. In order to avoid the "pollution" of the pressure sensor calibration with multipath effects, the calibration has a very long time constant (in the order of 30 to 100 seconds minimum). That is, calibration (or setting of the baseline pressure relative to which displacements are measured) takes place over many GNSS fix cycles. A receiver using a pressure sensor system can also be configured to use to disable or suspend the calibration operation if the GPS position is recognized as of low quality, for example, through a determination that pseudorange residuals are too high, or that vertical residuals are too high. In such a case, the operation can be configured to coast, using previous calibration values.

In practice, usually only one satellite at a time will be afflicted by transitory multipath. The above-described techniques can detect which satellite is at fault, simply by measuring the residual of each satellite as compared with the propagated position form the inertial/pressure sensors. This allows the receiver to make the position fix more accurate by rejecting measurements from the satellite afflicted with multipath or by coasting previous values.

Alternatively, an extra pseudorange error for one satellite can be measured against the data derived from a physical sensor, at the accuracy of the physical sensor. This allows a check of every satellite for accuracy against this reference, without depending on group-based techniques such as RAIM (Receiver Autonomous Integrity Monitoring).

Figure 2:
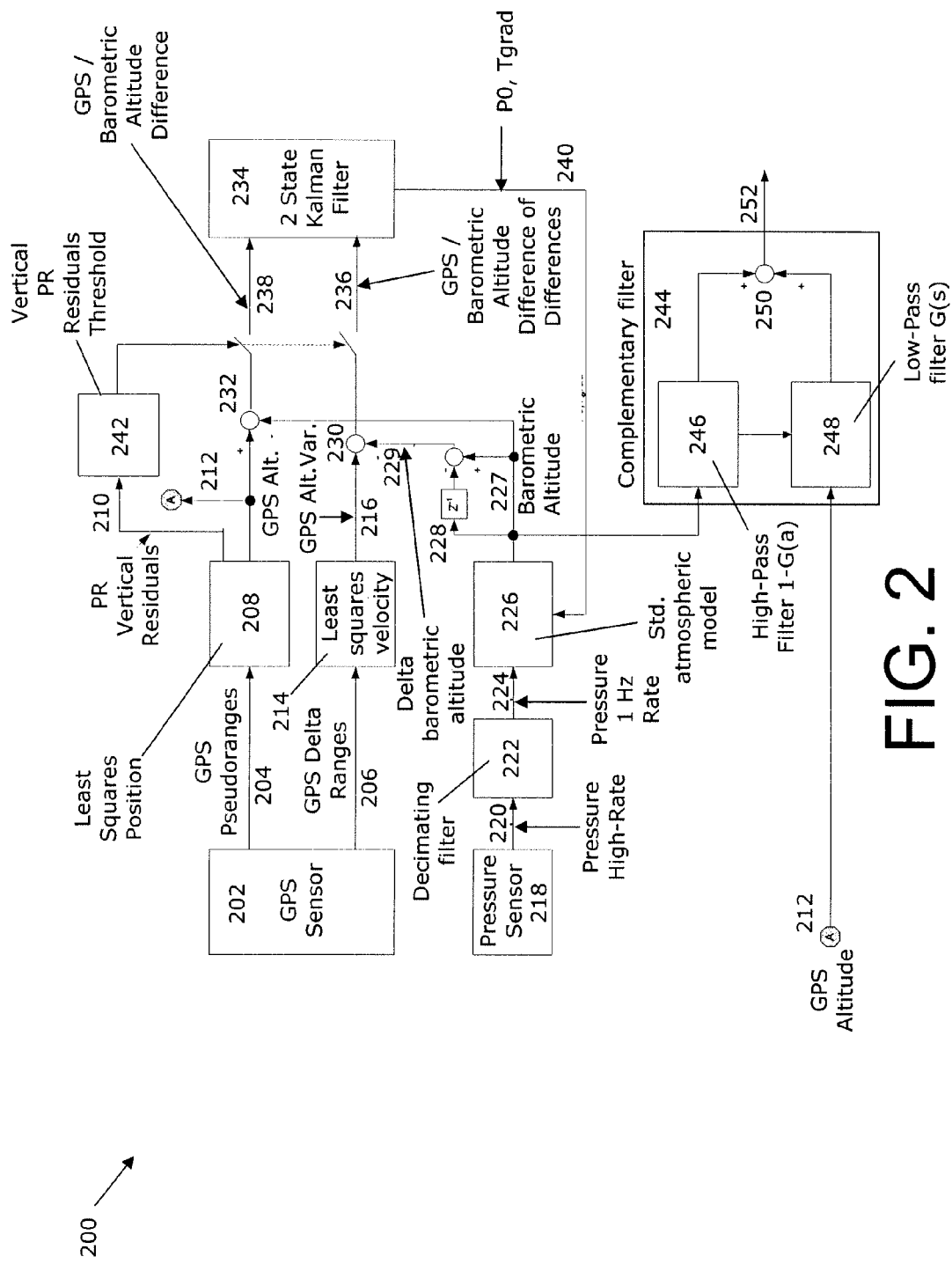
FIG. 2 is a GPS block diagram indicating a GPS system architecture according to certain embodiments.

FIG. 2 illustrates a block diagram of a receiver architecture 200 according to an embodiment of the present invention. FIG. 2 has a GNSS sensor 202, shown here as a GPS sensor, which acquires and tracks satellites and produces information relating to ranging measurements. Receiver architecture 200 also comprises a sensor 218, shown here as a pressure sensor. The GPS sensor 202 and pressure sensor 218 are filtered with a two-state Kalman filter 234 and a complementary filter 244 in the manner described below. It will be apparent that the filter embodiments as described herein can be significantly rearranged while still performing a function that will achieve the result intended by this disclosure.

GPS sensor 202 generates GPS pseudorange measurements at 204 and GPS delta pseudorange measurements at 206. The GPS pseudorange measurements are passed to a position solution section 208, which can be a least-squares type position solution algorithm as shown. Similar to the pseudorange measurements, delta pseudorange measurements are passed at 206 to a velocity solution section 214, which may be a least squares velocity solution section as shown. Here, the term "section", refers generally to code, circuitry or both configured to perform a certain function, usually being identifiable as a method, object or logical grouping of software instructions. If implemented as code, a section will generally be executed by an integrated circuit having a central processing unit, such as a microprocessor, microcontroller or application specific integrated circuit with an embedded CPU core. Software instructions for such sections are embedded in a machine readable medium, which can comprise, for example, a non-volatile memory such as Flash memory as an integrated circuit chip or portion of a chip.

Position solution section 208 outputs pseudorange vertical residuals at 210 and GPS-calculated altitude at 212 (shown as point A). The output 210 is connected to threshold section 242. Threshold section 242 determines whether the vertical pseudorange residuals are within acceptable limits, and if not, stops the input of data to Kalman filter 234 using switches 238 and 236. The inputs can be suspended at switch 241 if the calculated vertical pseudorange differences exceed a certain threshold, as calculated by threshold section 242, i.e. if it is likely that multipath has reduced the accuracy of a particular measurement to a significant extent. This allows the Kalman filter to coast and prevents the filter, and ultimately atmospheric model section 226, from being too heavily influenced by multipath distorted position fixes. GPS altitude output 212 is also differenced at 232 with a barometric altitude output 227 from atmospheric model section 226.

The resulting difference is fed to an input of Kalman filter section 234, here shown as a two-state Kalman filter, over switch 238. Here the term "input", when used as a noun, means connection suitable for electrically conveying information, such as a wire or interconnect, or a group of wires or interconnects arranged as a bus, for example. To improve the accuracy of the system, the Kalman filter section 234 is used to estimate $P_0$ and $T_{gad}$. The Kalman Filter observables are, for example: (1) altitude difference between the pressure sensor and GPS; and (2) the altitude variation difference between pressure sensor and vertical velocity (delta range), between two fixes. The internal states are: (1) $P_0$, the pressure at mean sea level (2) $T_{gad}$, the lapse in degrees Celsius/km. The process model of $P_0$ and $T_{gad}$ is a random walk, with a time constant to be adjusted on the weather conditions. Of course, Kalman filters with more or fewer states are possible, as are embodiments with no Kalman filters.

Variation in GPS altitude is output at 216 from velocity solution section 214 and differenced with barometric altitude differences 229 at 230. The resulting double difference is input through switch 236 to Kalman filter section 234. The altitude difference is generated by the output of pressure sensor 218 by passing it at 220 to a decimating filter 222, the output of which is in turn passed at 224 to an atmospheric model section 226. The series output of the model 227 is differenced with a single-stage delayed version of itself 228 to produce barometric altitude differences.

The standard atmosphere defined by the document US Standard Atmosphere 1976 (NOAA/NASA) "NOAA S/T 76-1562" can be used as a starting point. It defines a hydrostatic formula that relates atmospheric pressure and altitude, introducing two parameters, the pressure at sea level ($P_0$=1013 hPa), and the lapse, or temperature variation with altitude ($T_{gad}$=6.5 degrees C./km). The GPS altitude can be used for calibrating these two parameters eventually, significantly improving the accuracy of the barometric altitude. It should be noted thereby that barometric altitude and GPS altitude do not use the same reference. Barometric altitude is centered at the mean sea level, whereas the GPS altitude is defined above the geoidal ellipsoid as defined in WGS84 reference system.

The atmospheric model section 226 takes as inputs, for example, the pressure at sea level $P_0$ and the temperature gradient $T_{gad}$. These are Kalman filter states as calibrated by the GPS altitude and vertical velocity solutions, and are received from Kalman filter section 234.

The barometric altitude has an accurate relative information, with meter level or less altitude noise, but not particularly accurate absolute altitude. It is, however, quite responsive to fast altitude variations. In contrast, the GPS altitude has a good non-biased accuracy under nominal reception conditions, but has quite high altitude noise, which can be as large as 20 meters.

A blending filter implemented as complementary filter architecture is used in the embodiment shown in FIG. 2 to combine both types of information. The barometric altitude output 227 from atmospheric model section 226 is input to complementary filter 244 and passed to a high-pass filter 246. The GPS altitude 212 is also input to complementary filter 244 but passed to a low-pass filter. The outputs of both filters are summed at 250 and output as combined GPS/Barometric altitude information at 252

A complementary filter can be defined as a filter that receives two types of information and performs a filtering operation that advantageously uses complementary characteristics of both information types to produce a single output with improved characteristics. A complementary filter is advantageously used when, as here, the same information is available through different sensors, each of which has quite different noise characteristics. The absolutely low frequency accurate information (GPS information) is filtered with a low-pass filter, and the relatively, fast, accurate altitude is high-pass filtered. Preferably, the response of both filters is carefully controlled such as the sum of the amplitude responses of the low pass and high pass filter are exactly equal to one over the whole frequency range, effectively guaranteeing an "all pass" characteristic for the parameter of interest (altitude), but with differing noise processing. This technique as shown in FIG. 2 is in fact a Wiener filtering technique that works well, as the required noise-like behavior of the signal is well-enforced (the "signal" to optimize is actually the noise on both sensors). It is worthwhile to note that this structure does not necessitate a static position for the receiver; the data blending occurs even if there is a significant vertical component of motion. The order of the complementary filter is either first order, or can be higher order if more separation between the noises sources is necessary.

The complementary filter should take altitude on both sides of the filter. The natural information from the pressure sensor is obviously pressure, and the standard atmospheric pressure formula can be used. It could be used as is, as the altitude/pressure gradient of the model is not too sensitive to $P_0$ and $T_{gad}$. The $P_0$ is effectively eliminated by the complementary filter.

As will be apparent to a person of skill in the art, the above-described embodiments can be modified in any of a variety of ways while not departing from the core teachings of the invention. The above-described embodiments are not intended as any way to be a limitation or disclaimer of subject matter, but rather intended to inform the following claims.

What is claimed is:

1. An navigation receiver, comprising:
a physical sensor input; and
circuitry coupled to the physical sensor input;
wherein the circuitry is configured to use information from the physical sensor input for multipath mitigation in a GNSS position.

2. The navigation receiver of claim 1, wherein the physical sensor input is adapted to be connected to a physical sensor, wherein relative measurements of the physical sensor are more accurate than absolute measurements of the physical sensor.

3. The navigation receiver of claim 2, wherein the circuitry coupled to the physical sensor input is configured to derive first position-related data from the sensor input; and wherein the circuitry coupled to the physical sensor is configured to blend the first position-related data with second position-related data received from a GNSS sensor.

4. The navigation receiver of claim 3, wherein the circuitry coupled to the physical sensor input is configured to carry out a complementary filter operation.

5. The navigation receiver of claim 1, wherein the physical sensor input is adapted to be connected to a non-GNSS sensor.

6. The navigation receiver of claim 1, wherein the physical sensor is a pressure sensor and wherein the circuitry comprises central processing unit executing a position solution section, a velocity solution section, a Kalman filter and an atmospheric model section.

7. A method for multipath mitigation, comprising:
receiving a GNSS measurement from a primary GNSS system;
calculating a position based on the GNSS measurement;
receiving a first position-related datum derived from a sensor input, not derived from the primary GNSS system and corresponding approximately in time to the GNSS measurement; and
determining whether the position based on the GNSS measurement was significantly affected by multipath by using the first position-related datum;
wherein the first position related-datum is an acceleration.

8. The method of claim 7, wherein the step of determining whether the position based on the GNSS measurement was significantly affected by multipath further comprises using a second position-related datum derived from the sensor input and corresponding to a time previous to the time of the GNSS measurement.

9. The method of claim 8, wherein the step of determining whether the position based on the GNSS measurement was significantly affected by multipath comprises computing a difference between the first position-related datum and the second position-related datum.

10. The method of claim 9, further comprising the step of filtering the difference between the first position-related datum and the second position-related datum with a complementary filter having as an input a corresponding position related datum derived from GNSS signals.

11. The method of claim 10, wherein the complementary filter comprises a high-pass filter and a low-pass filter.

12. The method of claim 7, wherein an altitude is calculated using an atmospheric model.

13. A portable navigation system, comprising:
a primary GNSS sensor;
a sensor not based on the primary GNSS; and
a microprocessor configured to use input derived from the GNSS sensor and the sensor not based on the primary GNSS to perform multipath mitigation in a GNSS position.

14. The portable navigation system of claim 13, wherein the sensor not based on the primary GNSS is a pressure sensor.

15. The portable navigation system of claim 13, further comprising a machine-readable medium comprising software instructions that, when executed by the microprocessor, perform a method comprising the steps of:
- computing a GNSS position;
- computing a position change based on a measurement derived from the sensor not based on the primary GNSS; and
- comparing the position change against a threshold to determine whether the GNSS position is likely to be significantly affected by multipath.

16. The portable navigation system of claim 15, wherein the position change comprises a change in altitude.

17. The portable navigation system of claim 15, wherein the method further comprises augmenting the GNSS position with altitude information derived from the sensor not based on the primary GNSS through the use of a complementary filter.

18. An apparatus for multipath mitigation, comprising:
- means for receiving a GNSS measurement from a primary GNSS system;
- means for calculating a position based on the GNSS measurement;
- means for receiving a first position-related datum derived from a sensor input, not derived from the primary GNSS system and corresponding approximately in time to the GNSS measurement; and
- means for determining whether the position based on the GNSS measurement was significantly affected by multipath by using the first position-related datum;

wherein the first position related-datum is an acceleration.

* * * * *